United States Patent [19]

Fleckenstein

[11] 3,993,638
[45] Nov. 23, 1976

[54] BALLASTED p-SULFONAMIDOPHENOLS CAPABLE OF RELEASING A NON-HETEROCYCLIC AZO DYE

[75] Inventor: Lee J. Fleckenstein, Rochester, N.Y.

[73] Assignee: Eastman Kodak Company, Rochester, N.Y.

[22] Filed: June 5, 1975

[21] Appl. No.: 583,940

Related U.S. Application Data

[60] Division of Ser. No. 351,700, April 16, 1975, Pat. No. 3,928,312, which is a continuation-in-part of Ser. No. 282,795, Aug. 22, 1972, abandoned, which is a continuation-in-part of Ser. No. 176,752, Aug. 31, 1971, abandoned.

[52] U.S. Cl. ................................. 260/197; 260/206
[51] Int. Cl.² ................. C09B 29/36; C09B 29/38; G03C 5/30; G03C 7/00
[58] Field of Search ............... 260/197, 193, 558 A, 260/205, 206, 199, 156; 96/29 D, 55

[56] References Cited
UNITED STATES PATENTS

| | | |
|---|---|---|
| 3,148,062 | 9/1964 | Whitmore et al. ............ 260/197 X |
| 3,252,969 | 5/1966 | Blout et al. ..................... 260/195 |
| 3,440,240 | 4/1969 | Yuhne et al. ................. 260/206 X |
| 3,443,939 | 5/1969 | Bloom et al. ......................... 96/3 |
| 3,443,940 | 5/1969 | Bloom et al. ......................... 96/3 |
| 3,622,328 | 11/1971 | Pollet et al. ......................... 96/55 |
| 3,698,897 | 10/1972 | Gompf et al. ....................... 96/3 |
| 3,734,726 | 5/1973 | Figueras et al. .................... 96/3 |
| 3,751,406 | 8/1973 | Bloom ................................. 96/3 |

FOREIGN PATENTS OR APPLICATIONS 602,607  8/1960  Canada ..................................... 96/3

OTHER PUBLICATIONS

Titov et al., Zhur. Obsh. KHIMII, vol. 30, pp. 623 to 628, (1960).

*Primary Examiner*—Floyd D. Higel
*Attorney, Agent, or Firm*—Harold E. Cole

[57] ABSTRACT

Nondiffusible p-sulfonamidophenols which are alkali-cleavable upon oxidation to release a diffusible color-providing moiety from the benzene nucleus having the formula:

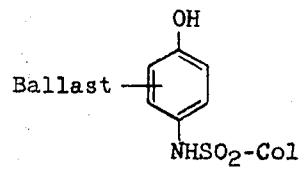

wherein Col is a dye or dye precursor moiety, and Ballast is an organic ballasting radical which renders the compound nondiffusible in a photographic element during development with an alkaline processing composition.

4 Claims, No Drawings

BALLASTED P-SULFONAMIDOPHENOLS CAPABLE OF RELEASING A NON-HETEROCYCLIC AZO DYE

This application is a division of application Ser. No. 351,700, filed Apr. 16, 1975, now U.S. Pat. No. 3,928,312 which is a continuation-in-part of application Ser. No. 282,795 filed Aug. 22, 1972, now abandoned which in turn is a continuation-in-part of application Ser. No. 176,752 filed Aug. 31, 1971, now abandoned.

This invention relates to novel p-sulfonamidophenol compounds which are alkali-cleavable upon oxidation.

In U.S. Pat. No. 3,443,939, "splittable" ring-closing compounds are described wherein a diffusible dye moiety is split off the compound and transferred to provide the desired image while the remainder of the compound undergoes an internal cyclization or ring-closing reaction. The p-sulfonamidophenol compounds of my invention do not undergo the intramolecular ring-closure mechanism described in that patent and therefore have a simple molecular structure. Further, many of the ring-closing compounds in this patent are illustrated with a p-phenylenediamine moiety on the ring which takes part in the ring-closing mechanism. However, p-phenylenediamines have a well-known propensity to desensitize emulsions. Since my compounds do not have a p-phenylenediamine moiety on them, they can be incorporated in an emulsion layer, if desired, without emulsion desensitization.

In U.S. Pat. No. 3,443,940, nondiffusible compounds are described which are capable of reacting with an oxidized color developer or which are capable of providing an oxidation product which may autoreact intramolecularly in such a way as to form a new aromatic or heterocyclic ring and, as a function of such reaction and ring formation, to split off a mobile and diffusible color-providing material. Here again, a p-phenylenediamine moiety on the ring to take part in the ring-closing mechanism has the disadvantages described above. In column 8 of this patent, a compound having the following formula is described:

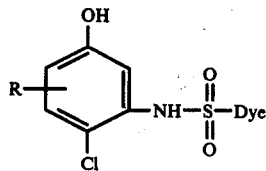

The p-sulfonamidophenols of my invention, however, operate in quite a different manner from the m-sulfonamidophenols of that patent, as will be explained in more detail hereinafter.

It is an object of this invention to provide novel p-sulfonamidophenols.

It is another object of this invention to provide novel p-sulfonamidophenols which are alkali-cleavable upon oxidation by an electron transfer developer to release a diffusible color-providing moiety from the benzene nucleus.

These and other objects are achieved by my invention which is described hereinafter.

The novel p-sulfonamidophenol compounds of my invention may be represented by the following formula:

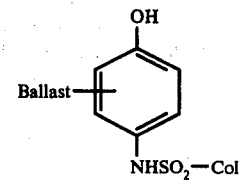

wherein:
1. Col is a dye or dye precursor moiety and
2. Ballast is an organic ballasting radical of such molecular size and configuration as to render the compound nondiffusible during development in an alkaline processing composition.

The nature of the ballast group in the formula for the compounds described above (Ballast) is not critical as long as it confers nondiffusibility to the compounds. Typical ballast groups include long-chain alkyl radicals linked directly or indirectly to the compound as well as aromatic radicals of the benzene and naphthalene series indirectly attached or fused directly to the benzene nucleus, etc. Useful ballast groups generally have at least 8 carbon atoms and may even comprise a polymer backbone or a dye or dye precursor (Col) as defined below, e.g.,

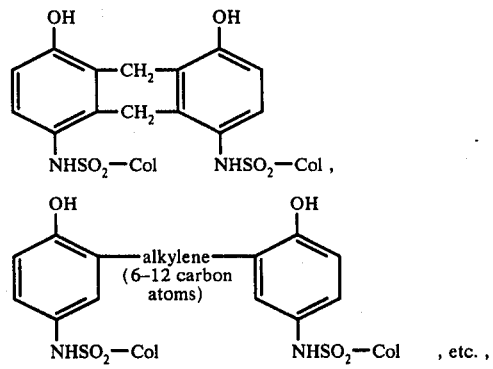

wherein Col has the same definition as in the formula above. In certain preferred embodiments of my invention, Ballast is either an alkyl group of 8 to 22 carbon atoms, an amide radical having 8 – 30 carbon atoms or a keto radical having 8 – 30 carbon atoms.

In addition to Ballast, the benzene nucleus in the above formula may have groups or atoms attached thereto such as the halogens, alkyl, aryl, alkoxy, aryloxy, nitro, amino, alkylamino, arylamino, amido, cyano, alkylmercapto, keto carboalkoxy, heterocyclic group, etc. In addition, such groups may combine together with the carbon atoms to which they are attached on the ring to form a fused ring which may be saturated or unsaturated including a carbocyclic ring, a heterocyclic ring, etc. When an aromatic ring is directly fused to the benzene nucleus of a p-sulfonamidophenol compound of the invention, such p-sulfonamidonaphthol is considered to be a species of a p-sulfonamidophenol and thus included within the definition.

As previously mentioned, Col in the above formula represents a dye or dye precursor moiety. Such moieties are well-known to those skilled in the art and include dyes such as azo, azomethine, azopyrazolone, indoaniline, indophenol, anthraquinone, triarylmethane, alizarin, merocyanine, nitro, quinoline, cyanine, indigoide, phthalocyanine, metal complexed dyes, etc., and dye precursors such as a leuco dye, a group containing a reduced imine linkage which upon oxidation forms an imine dye chromophore as described and claimed in my coworkers' Lestina and Bush U.S. Pat. No. 3,880,658 issued Apr. 29, 1975, a "shifted" dye which shifts hypsochromically or bathochromically when subjected to a different environment such as a change in pH, reaction with a material to form a complex, etc. Col could also be a coupler moiety such as a phenol, naphthol, indazolone, open-chain benzoyl acetanilide, pivalylacetanilide, malonamide, malonanilide, cyanoacetyl, coumarone, pyrazolone, compounds described in U.S. Pat. No. 2,756,142, etc. These compounds may contain a solubilizing group, if desired. In certain preferred embodiments of my invention, Col represents a preformed dye since such p-sulfonamidophenol compounds are more adaptable in controlling the hue of the dye which splits off the p-sulfonamidophenol and which is ultimately transferred to form a dye image, i.e., the color of the diffusible dye moiety which splits off is essentially the same color as the original starting compound. Preferred preformed dyes include azo, azomethine, indoaniline, indophenol and anthraquinone. Examples of dye groups useful in the above formula include the following:

YELLOW DYE GROUPS

4-Hydroxy azobenzene

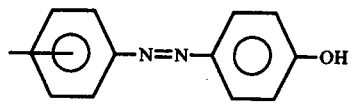

3-methyl-4-hydroxy azobenzene

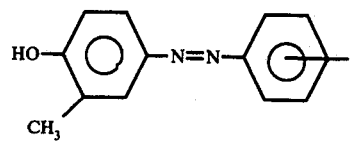

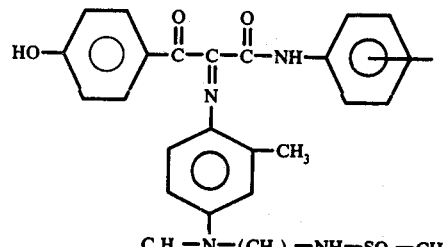

p-sulfhydryl azobenzene

MAGENTA DYE GROUPS

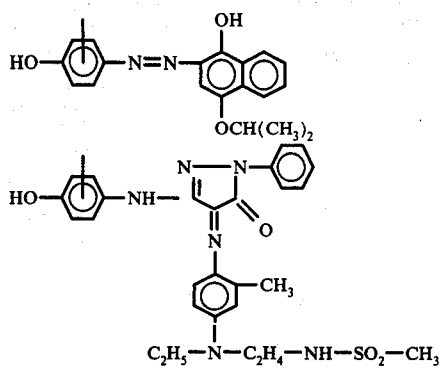

CYAN DYE GROUPS

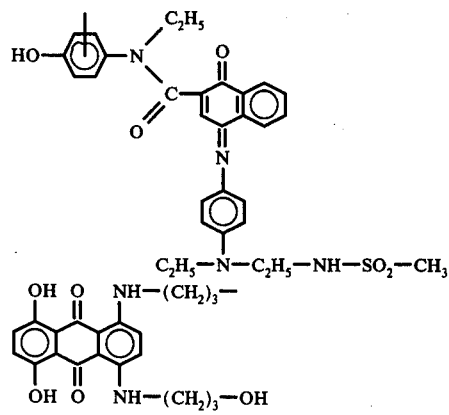

When dye precursor moieties are employed in my invention instead of dyes, they are converted to dyes by means wellknown to those skilled in the art, e.g., oxidation, either in a photosensitive element, in a processing composition or in a dye image-receiving layer to form a visible dye. Such techniques are disclosed, for example, in British Pat. Nos. 1,157,501; 1,157,502; 1,157,503; 1,157,504; 1,157,505; 1,157,506; 1,157,507; 1,157,508; 1,157,509; 1,157,510; and U.S. Pat. Nos. 2,774,668; 2,698,798; 2,698,244; 2,661,293; 2,559,643; etc.

Compounds within the scope of my invention include the following:

Compound No. I

3-Pentadecyl-4-(p-phenylazobenzenesulfonamido)-phenol

Compound No. II

1-Hydroxy-4-(p-phenylazobenzenesulfonamido)-2-[δ-(2,4-di-tert-amylphenoxy)-n-butyl]-naphthamide

Compound No. III

8-Acetamido-3,6-disulfo-2-{p-[(4-hydroxy-2-pentadecyl)-phenylsulfamoyl]-phenylazo}-1-naphthol monopyridinium salt

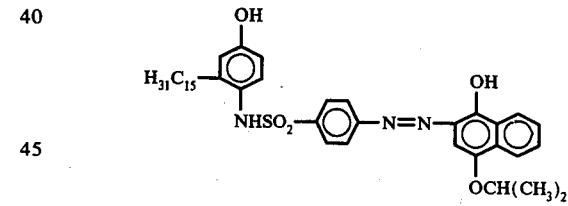

Compound No. IV

2-{p-[(4-Hydroxy-2-pentadecyl)-phenylsulfamoyl]-phenylazo}-4-isopropoxynaphthol

Compound No. V

4-{p-[4'-(N,N-Dimethylamino)-phenylazo]-benzenesulfonamido}-3-pentadecylphenol

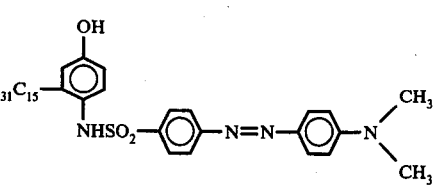

Compound No. VI

1-Hydroxy-4-[3-(1-phenyl-3-methylcarbamyl-4-pyrazolin-5-onylazo)-benzenesulfonamido]-2-[δ-(2,4-di-tertamylphenoxy)-n-butyl]-naphthamide

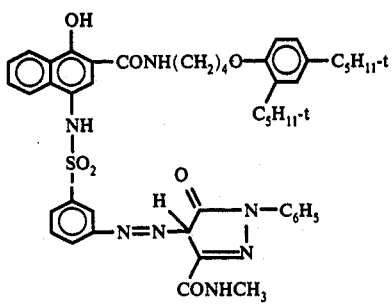

Compound No. VII -

Shifted Magenta Dye-Providing

1-Hydroxy-4-[3-(N-[4-(3,5-dibromo-4-hydroxy-phenylimino)-1-phenyl-2-pyrazolin-5-on-3-yl]carbamyl)-benzenesulfonamido]-2-[δ-(2,4-di-tert-amylphenoxy)-n-butyl]naphthamide

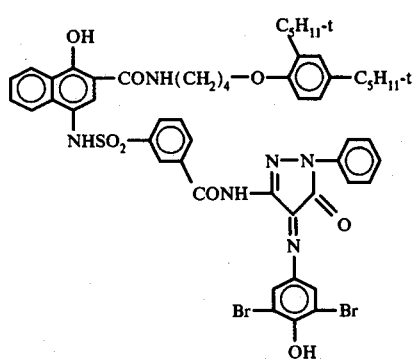

Compound No. VIII -

Cyan Dye-Providing (Initially Leuco)

1-Hydroxy-4-[3-(4-[3-chloro-5-(3,5-dichloro-4-hydroxyanilino)-2-hydroxy-4-methylanilino]-6-hydroxy-s-triazinyl-2-amino)-benzenesulfonamido]-2-[δ-(2,4-di-tert-amylphenoxy)-n-butyl]-naphthamide

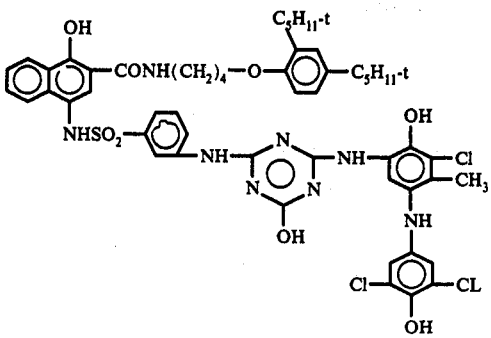

Compound No. IX -

Shifted Yellow Dye-Providing

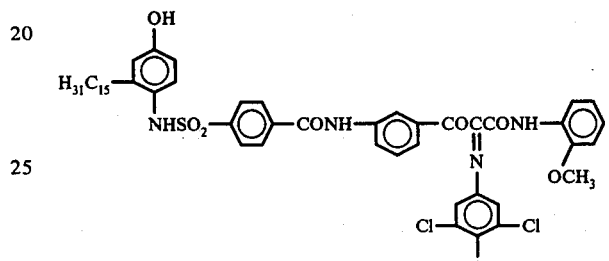

Compound No. X -

Shifted Yellow Dye-Providing

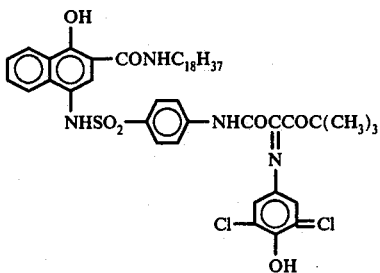

Compound No. XI -

Shifted Magenta Dye-Providing

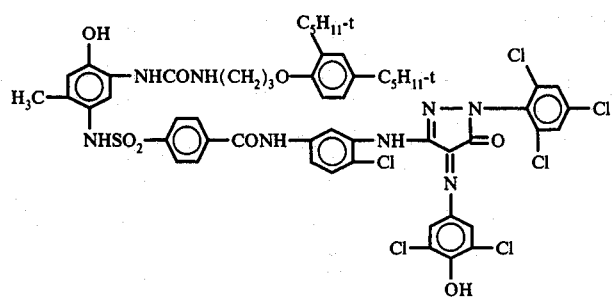

Compound No. XII -
Shifted Magenta Dye-Providing
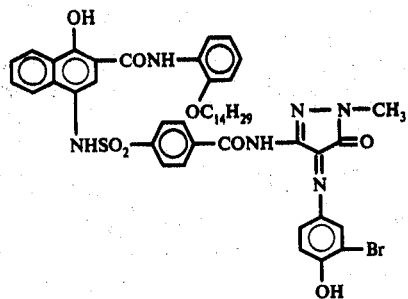
Compound No. XIII -
Shifted Cyan Dye-Providing
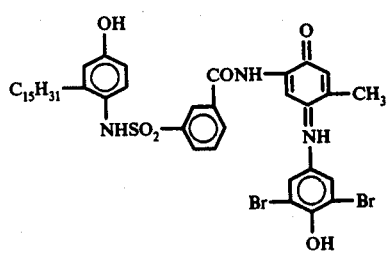
Compound No. XIV -
Shifted Cyan Dye-Providing
Compound No. XV -
Yellow Dye-Providing (Initially Leuco
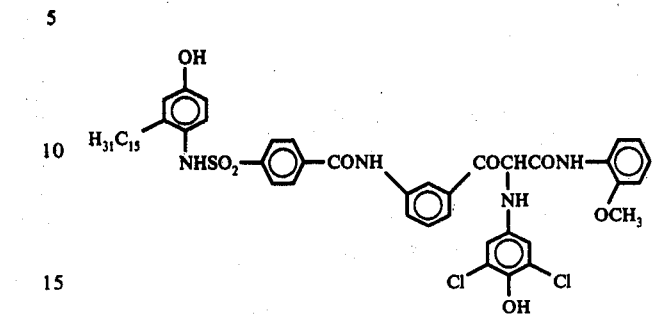
Compound No. XVI -
Yellow Dye-Providing (Initially Leuco)
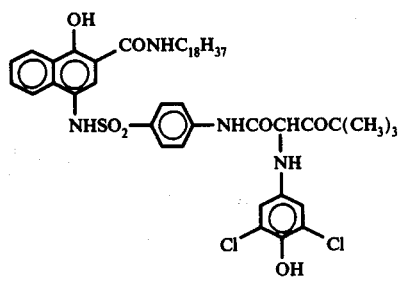
Compound No. XVII -
Magenta Dye-Providing (Initially Leuco)
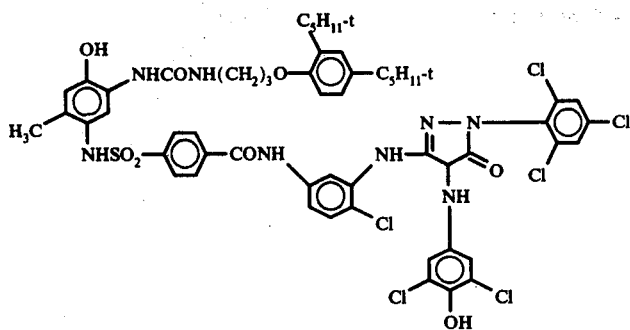
Compound No. XVIII -
Magenta Dye-Providing (Initially Leuco)
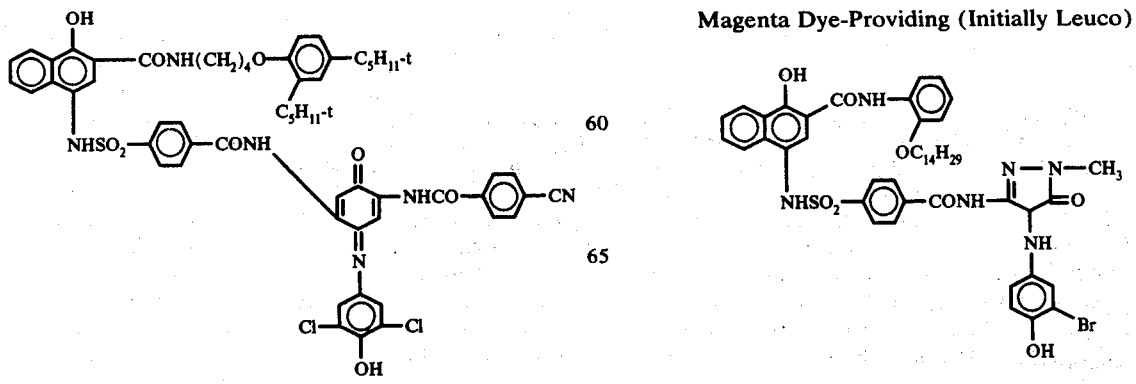

Compound No. XIX -
Cyan Dye-Providing (Initially Leuco)

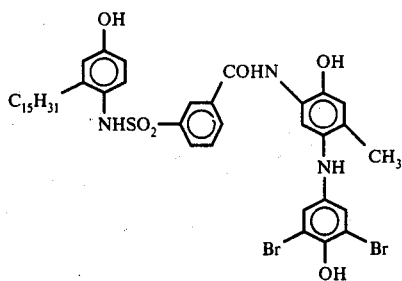

Compound No. XX -
Cyan Dye-Providing (Initially Leuco)

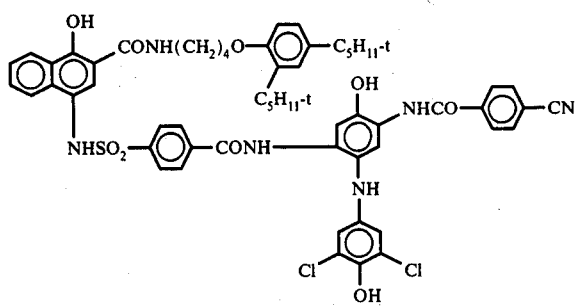

Of the above compounds, especially good results are obtained with Compound Nos. III, IV, V, VI and VII.

The dye image-providing compounds of the present invention may be employed in photographic elements by using coating solutions containing between about 0.5 and about 8 percent by weight of the dye image-providing compound distributed in a hydrophilic film-forming natural material or synthetic polymer, such as gelatin, polyvinyl alcohol, etc., which is adapted to be permeated by aqueous alkaline processing composition. The photographic element is developed by means of an electron transfer developer such as:
hydroquinone,
N-methylaminophenol
Phenidone (1-phenyl-3-pyrazolidone),
Dimezone (1-phenyl-4,4-dimethyl-3-pyrazolidone),
aminophenols, etc.

The developing agent becomes oxidized upon development and reduces silver halide in the photographic element to silver metal. The oxidized developer then cross-oxidizes the p-sulfonamidophenol. The product of cross-oxidation then undergoes alkaline hydrolysis, thus releasing an imagewise distribution of diffusible dye or dye precursor which then diffuses to an image-receiving layer to provide a dye image. The diffusible moiety is transferable in alkaline processing composition either by virtue of its self-diffusivity or by having attached to it one or more solubilizing groups such as as COOH, $SO_3H$, $SO_2NHX$, OH, SH, etc. Although it is not intended to limit the present invention to any particular theory or reaction mechanism, it is believed that the following chemical reactions take place in utilizing my novel compounds in a photographic element:

1. Development of a latent image with an electron transfer developer such as hydroquinone, thereby oxidizing it to a quinone

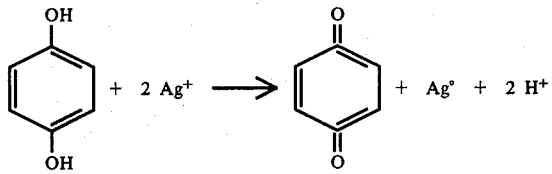

2. Cross-oxidation step in which quinone is reduced and dye-releasing compound is oxidized

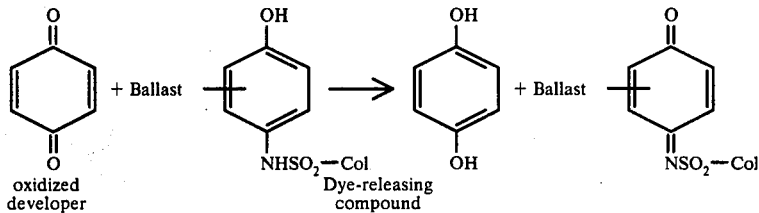

3. Alkaline hydrolysis to release a diffusible dye

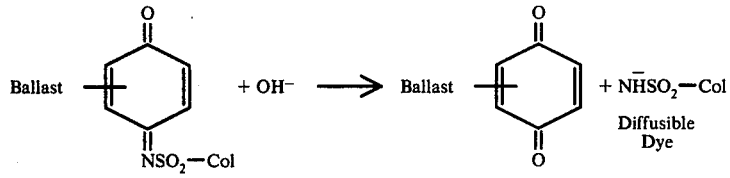

A m-sulfonamidophenol, such as those described in prior-art U.S. Pat. No. 3,443,940, would not be useful in the above-described chemical reactions. Such m-sulfonamidophenols require the use of a color developing agent to be operable since electron transfer developers would not be of use. A process employing these m-sulfonamidophenols and a color developing agent is defined as an oxidative-condensation reaction since these two materials have to combine chemically. In using the said p-sulfonamidophenols of my invention, no color developing agent is necessary. This is advantageous since color developers are difficult to handle and control, while conventional electron transfer developers do not suffer from such disabilities. In addition, no chemical condensation is necessary in using my novel p-sulfonamidophenols. The developer employed in this redox process only undergoes an electron exchange and no oxidative condensation reaction is required. This is illustrated in step 2) above, where the oxidized developer acquires two electrons from the p-sulfonamidophenol, converting it to a quinonemonosulfonamide, and in the process is converted back to developer.

The following examples further illustrate the invention.

Example 1

Preparation of Compound No. I

To a solution of 16 g. of 4-amino-3-pentadecylphenol in 100 ml. pyridine cooled in an ice bath is added 14 g. of p-phenylazobenzenesulfonyl chloride. After 5 hours stirring, the mixture is poured into ice water containing 150 ml. concentrated hydrochloric acid. The resulting solid is recrystallized from ethanol, methanol, and acetonitrile to give an orange solid, m.p. 125°–127° C., resolidified, second m.p. 143°–144° C.

EXAMPLE 2

Preparation of Compound No. II

To a solution of 24.5 g. of 4-amino-2-(N-[4'-(2,4-di-tert-pentylphenoxy)-butyl]-carbamyl)-naphthol in 150 ml. pyridine cooled in an ice bath is added 15.5 g. of p-phenylazobenzenesulfonyl chloride. After 2 hours stirring, the mixture is poured into ice water containing 150 ml. concentrated hydrochloric acid. The resulting solid is recrystallized from ethyl acetate and from 1:1 tetrahydrofuran-ethanol to give an orange solid, m.p. 235°–237° C.

EXAMPLE 3

Preparation of Compound No. III

To a suspension of 2.4 g. of 4-(p-aminobenzenesulfonamido)-3-pentadecylphenol in a mixture of 75 ml. of glacial acetic acid and 6 ml. concentrated hydrochloric acid is added a solution of 0.4 g. sodium nitrate in 5 ml. H₂O. The yellow suspension is stirred for 1 hour, then poured into a solution of 2.4 g. acetyl H-acid in 100 ml. methanol cooled in an ice bath. 50 Ml. of pyridine is then added and the magenta-colored solution is stirred for 1 hour at 0° C., filtered, and concentrated to dryness under vacuum. The residual is washed with water and acetronitrile and recrystallized from ethanol to give a red solid.

EXAMPLE 4

Preparation of Compound No. IV

To a stirred suspension of 8.5 g. of 4-(p-aminobenzenesulfonamido)-3-pentadecylphenol in 240 ml. of glacial acetic acid is added 22 ml. concentrated hydrochloric acid, followed by a solution of 1.5 g. sodium nitrite in 10 ml. water. The mixture is stirred at room temperature for 1 hour, then poured into a solution of 36 g. potassium acetate and 4 g. 4-isopropoxy-1-naphthol in 400 ml. methanol cooled in an ice bath. The mixture is stirred for one hour at 0° C., filtered, and then concentrated to dryness under vacuum. The residue was recrystallized from methanol and isopropyl alcohol to yield a red solid, m.p. 83°–87° C.

EXAMPLE 5

Preparation of Compound No. V

To a stirred suspension of 7.6 g. of 4-(p-aminobenzenesulfonamido)-3-pentadecylphenol in 200 ml. of glacial acetic acid is added 20 ml. concentrated hydrochloric acid, followed by a solution of 1.3 g. sodium nitrite in 10 ml. water. The mixture is stirred at room temperature for 50 minutes, then poured into a solution of 32 g. potassium acetate and 6.1 g. N,N-dimethylaniline in 350 ml. methanol cooled in an ice bath. The mixture is stirred for 1 hour at 0° C. and filtered. The collected solid is washed with methanol and water, then recrystallized from ethanol, cyclohexane-ethyl acetate, and isopropyl alcohol to give copper-orange plate, m.p. 141°–157° C.

EXAMPLE 6

A single-layer supported gelatinous silver halide (cubic bromide) emulsion coating is prepared which contains per square foot of coating 60 mg. of Compound No. I, 120 mg. of di-n-butylphthalate, 100 mg. of silver and 450 mg. of gelatin. A sample of the photosensitive element is exposed to a graduateddensity multicolor test object. A processing composition comprising 1-phenyl-3-pyrazolidone (developing agent) (0.5 g./l.), NaOH (0.1 normal) and hydroxyethylcellulose (30 g./l.) is employed in a pod and is spread between the exposed surface of the photosensitive element and a superposed dye image-receiving element comprising a support coated with 700 mg/ft.² of gelatin and 150 mg./ft.² of the mordant N-n-octadecyl-tri-butylammonium bromide, by passing the transfer "sandwich" between a pair of juxtaposed pressure rollers.

After 5 minutes at about 24° C., the film unit is separated. A negative yellow dye image is observed on the dye image-receiving sheet.

EXAMPLE 7

Preparation of Compound No. VI

To a solution of 44.3 g. (0.0905 mole) of 1-hydroxy-4-amino-N{Δ-(2,4-di-t-pentylphenoxy)butyl}2-naphthamide in 40 ml. of dry pyridine cooled to 5° C. and stirred in a nitrogen atmosphere are added 38.0 g. (0.0905 mole) of 1-phenyl-3-methylcarbamyl-4-(m-chlorosulfonylphenylazo)-5-pyrazolone. The mixture is stirred for 3 hours at room temperature and poured into a mixture of ice and hydrochloric acid. The precipitate is collected, dried and recrystallized from butanol to give 47 g. (59%) of a bright orange solid, m.p. 212° C.

EXAMPLE 8

Preparation of Compound No. VII

Compound VII is prepared according to the following procedure:

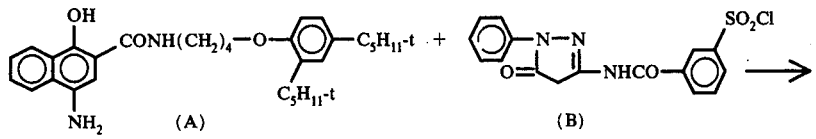

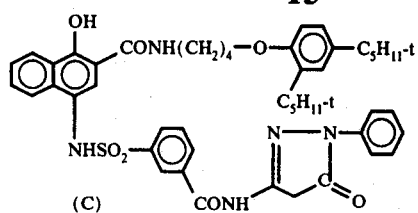

(C)

Equimolar (.1 mol.) amounts of the amino naphthol (A) and the sulfonyl chloride (B) are allowed to react in tetrahydrofuran for 2½ hours at room temperature. After the product has separated from solution on addition of water, it is recrystallized from methanol and water, m.p. 143°–146° C.

Substituted pyrazolone (C) is oxidatively coupled with 2,6-dibromo-4-aminophenol according to the following scheme:

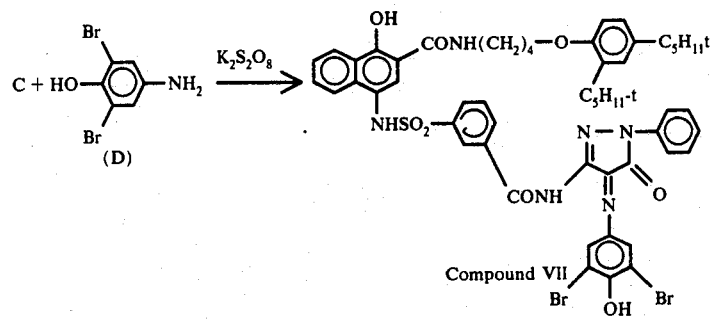

The above reaction is run by using equimolar (0.00228 mol.) quantities of (C), the aminophenol (D) and K₂S₂O₈ oxidant in a mixture of dilute aqueous Na₂CO₃ and n-butyl alcohol. The crude product is recovered from the organic phase, following washing and drying, by solvent removal. It is then purified by column chromatography, m.p. >200° C. with decomposition.

EXAMPLE 9

Preparation of Compound No. VIII

Compound VIII is prepared by coupling of sulfonamidophenol (E):

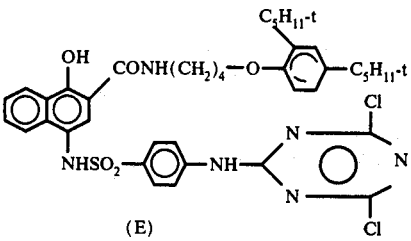

(E)

with a preformed indophenol leuco dye of the following structure:

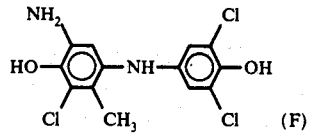

(F)

Compound (F) is made according to the following sequence of reactions:

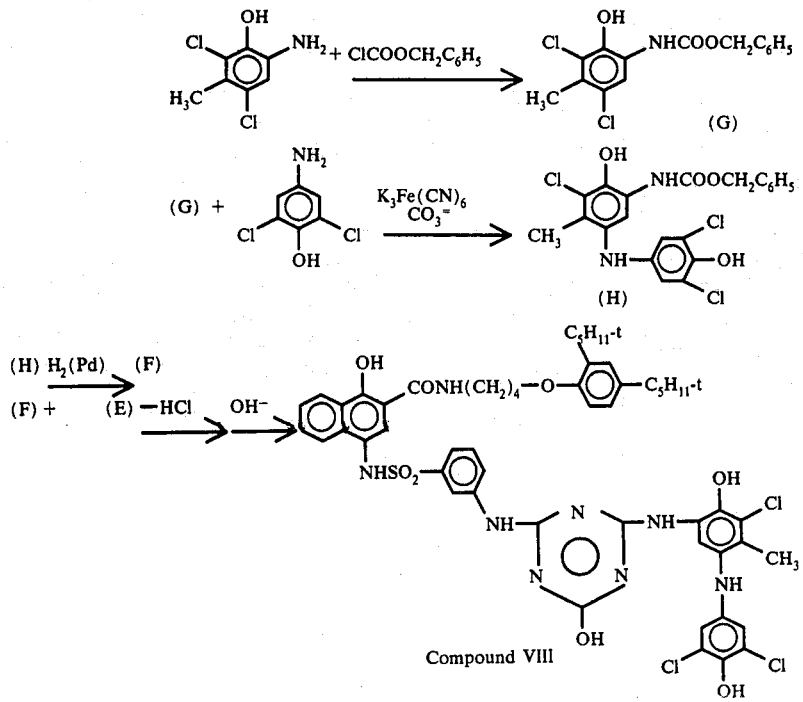

Compound VIII

The invention has been described with particular reference to certain preferred embodiments thereof, but it will be understood that variations and modifications can be effected within the spirit and scope of the invention.

I claim:
1. A compound having the formula:

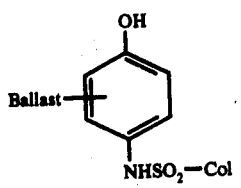

wherein:
1. Col is a non-heterocyclic azo dye moiety, and
2. Ballast is an organic ballasting radical containing at least 8 carbon atoms which renders said compound nondiffusible in a photographic element during development with an alkaline processing composition.

2. The compound of claim 1 wherein an aromatic ring is directly fused to

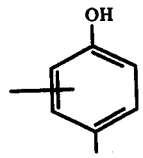

to provide a p-sulfonamidonaphthol.

3. The compound according to claim 1 which is 2 - { P - [(4-hydroxy-2-pentdecyl)-phenylsulfamoyl]-phenylazo }-4-isopropoxynaphthol.

4. The compound according to claim 1 which is 4- p-[4'-(N,N-dimethylamino)phenylazo]-benzenesulfonamido -3-pentadecylphenol.

* * * * *